(12) United States Patent
Graff

(10) Patent No.: US 11,849,698 B2
(45) Date of Patent: Dec. 26, 2023

(54) TEAT CLEANING DEVICE, SYSTEM, AND METHODS OF USING THE SAME

(71) Applicant: Ecolab USA Inc., St. Paul, MN (US)

(72) Inventor: Tim Graff, Wausau, WI (US)

(73) Assignee: Ecolab USA Inc., St.Paul (MN)

( * ) Notice: Subject to any disclaimer, the term of this patent is extended or adjusted under 35 U.S.C. 154(b) by 24 days.

(21) Appl. No.: 16/904,965

(22) Filed: Jun. 18, 2020

(65) Prior Publication Data

US 2020/0396955 A1 Dec. 24, 2020

Related U.S. Application Data

(60) Provisional application No. 62/863,036, filed on Jun. 18, 2019.

(51) Int. Cl.
*A01J 7/04* (2006.01)

(52) U.S. Cl.
CPC ........................................ *A01J 7/04* (2013.01)

(58) Field of Classification Search
CPC ............................ A01J 7/04; A46B 2200/1093
See application file for complete search history.

(56) References Cited

U.S. PATENT DOCUMENTS

| | | | | |
|---|---|---|---|---|
| 2,655,675 A * | 10/1953 | Grover | ................... | A61C 17/26 15/23 |
| 5,235,937 A * | 8/1993 | Farina | ...................... | A01J 7/04 119/14.01 |
| 7,222,382 B2 * | 5/2007 | Choi | .................... | A61C 17/349 15/23 |
| 8,402,920 B2 * | 3/2013 | Dole | ......................... | A01J 7/04 119/664 |
| 8,622,026 B1 * | 1/2014 | Dole | ...................... | A01J 7/025 119/651 |
| 9,072,274 B2 | 7/2015 | Ewert | | |
| 9,642,334 B2 * | 5/2017 | Dole | ......................... | A01J 7/04 |
| 9,648,842 B1 * | 5/2017 | Mlsna | ...................... | A01J 7/04 |
| 9,961,879 B1 * | 5/2018 | Quinn | .................... | A46B 13/02 |
| 2002/0040688 A1 * | 4/2002 | Fransen | .................... | A01J 7/04 119/651 |

(Continued)

FOREIGN PATENT DOCUMENTS

WO  WO-8900378 A1 * 1/1989
WO  WO-9927773 A1 * 6/1999 ............... A01J 7/04

(Continued)

OTHER PUBLICATIONS https://dairy-equipment.co.uk/products/sanicleanse-teat-scrubbers/.
https://www.gea.com/en/products/milking-farming-barn/dairyservice-dairy-farm-service/animal-hygiene/futurecow-prep-system.jsp.
https://www.puli-sistem.net/portfolio-item/f71/.

*Primary Examiner* — Joshua D Huson
*Assistant Examiner* — Edgar Reyes
(74) *Attorney, Agent, or Firm* — Fredrikson & Byron, P.A.

(57) ABSTRACT

A teat cleaning system provides a cleaning brush having first and second rotatable brushes that are rotated to clean the teat of an animal and to deliver a disinfectant, germicide, and/or purified water to the teat of the animal. During a cleaning mode, the disinfectant, germicide, and/or purified water may be delivered through the cleaning brush, and during a drying mode, no disinfectant or germicide is delivered to dry brush the teat of the animal for whisking away fluid and drying the teat.

18 Claims, 2 Drawing Sheets

(56) References Cited

U.S. PATENT DOCUMENTS

| | | | |
|---|---|---|---|
| 2012/0067288 A1* | 3/2012 | Dole ........................ | A01J 7/04 119/14.18 |
| 2015/0245586 A1* | 9/2015 | Dole ........................ | A01J 7/04 119/664 |

FOREIGN PATENT DOCUMENTS

| | | | | |
|---|---|---|---|---|
| WO | WO-2011025365 A1 * | 3/2011 | ................ | A01J 7/04 |
| WO | WO-2017208116 A1 * | 12/2017 | ................ | A01J 7/04 |

\* cited by examiner

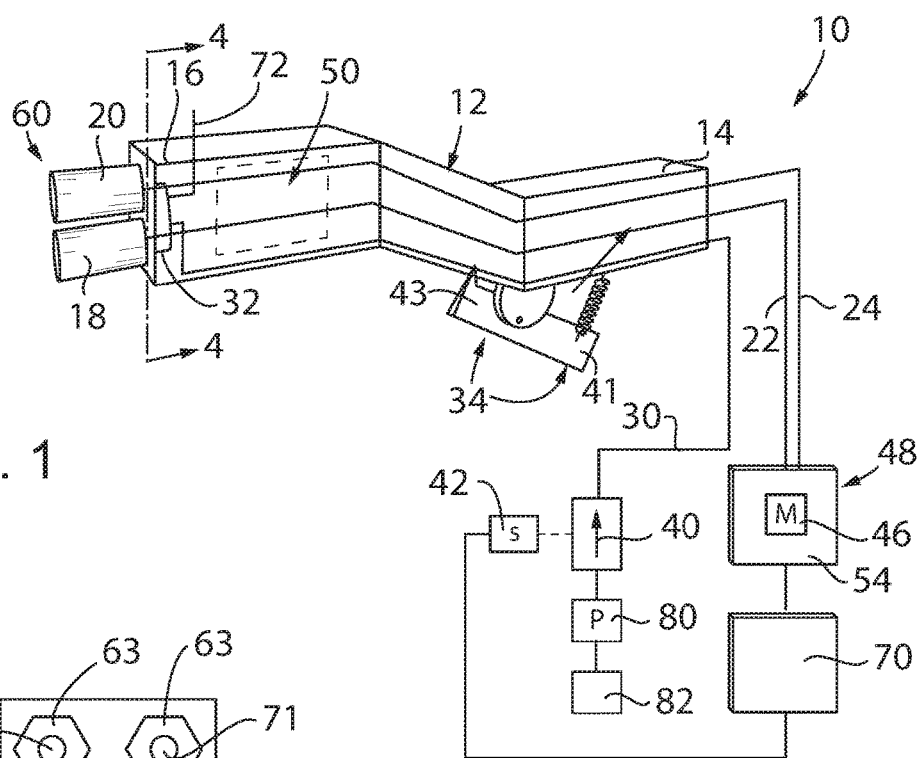
Fig. 1
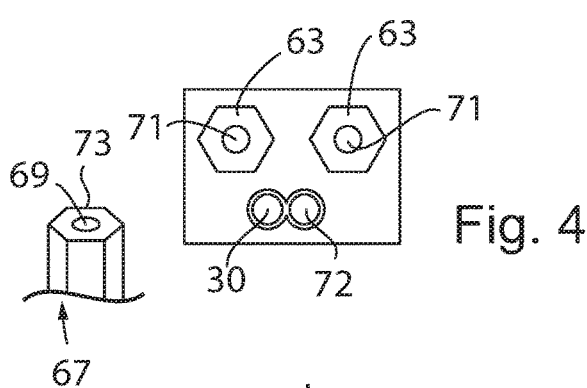
Fig. 4
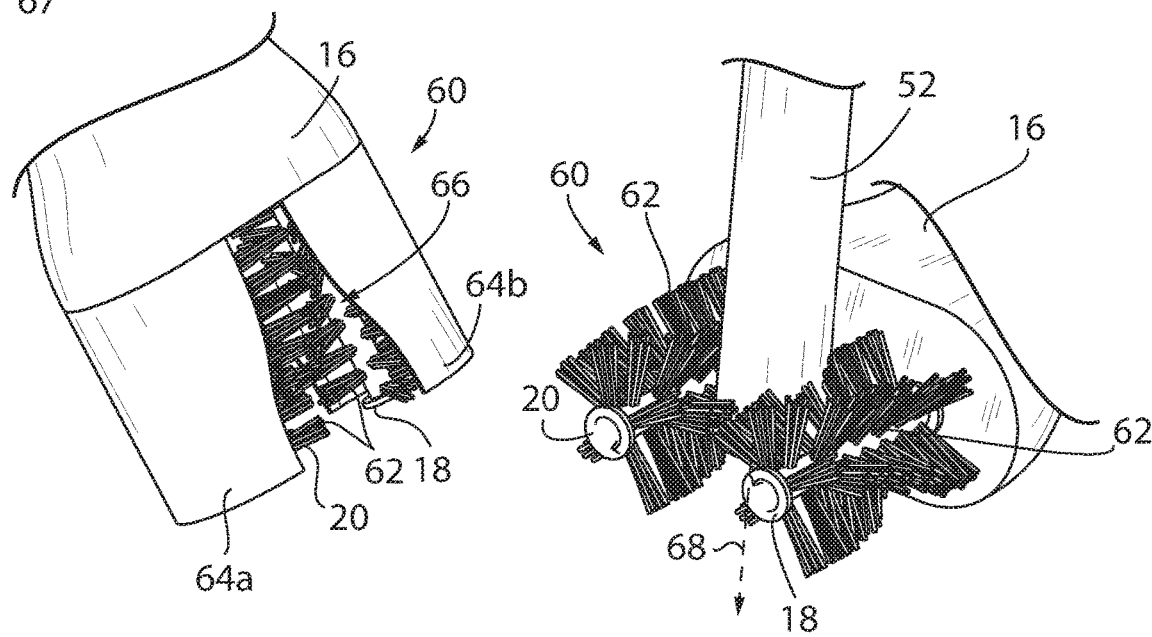
Fig. 2
Fig. 3

TEAT CLEANING DEVICE, SYSTEM, AND METHODS OF USING THE SAME

CROSS-REFERENCE TO RELATED APPLICATIONS

This application claims the benefit of U.S. Provisional Application No. 62/863,036, filed Jun. 18, 2019, and hereby incorporated by reference.

FIELD OF INVENTION

The invention relates to teat cleaning devices, systems, and methods for cleaning, disinfecting, and/or stimulating teats of an animal.

BACKGROUND OF THE INVENTION

The milking process requires several steps to ensure the efficient removal of non-contaminated milk. The teats of an animal are cleaned and stimulated to elicit optimal milk let down.

In typical milking processes, prior to milking, the milking cow arrives at the milking position with soiled teats from the environment. A worker removes any surface dirt present on the teats with a dry wipe with a towel. Optionally, the teats may be treated with a germicide pre-dip such as an iodine or chlorine dioxide solution in order to further sanitize the teat and kill any potentially harmful microorganisms. The worker then applies germicide to the teats, usually by hand or through an automated machine process, to aid in killing bacteria that may enter the teat canals and to prevent mastitis and protect teat health. The germicide is applied for 15 to 90 seconds and at least 15 seconds in order to kill the bacteria on the teats. A worker then removes the germicide along with any environmental contamination with a dry wipe with a towel, leaving the teats clean and dry. The worker will then stimulate the teat to remove a few streams of milk to visually check the quality of the milk for abnormalities ("pre-stripping" or "fore stripping") and then dry wipe with a towel one more time. The worker then applies the milking machine to the teats of the cow. These steps are typically accomplished by one, two, or three workers, each completing different steps in the process for efficiency.

During and following cleaning, the teats may be stimulated to facilitate the let-down process. The process of milk "let-down" in an animal is important to ensure that the animal is being milked as quickly and efficiently as possible, while minimizing any teat damage that may be caused by over milking. The milk let-down process is primarily controlled by suckling provided by a calf rubbing the udder or teat during feeding, which results in the release of oxytocin from the animal's pituitary gland to the udder via the bloodstream. Oxytocin causes various biological responses in the udder and teats that collectively allow the release of milk.

Recently, several teat cleaning devices and systems have been developed to assist with the teat cleaning processes. For example, teat cleaning brushes have been developed to assist with disinfecting, cleaning and/or drying the teat. However, these devices and systems have several disadvantages.

For example, the devices often contain complicated mechanical and electrical components that may (1) malfunction in the wet environment of a milking parlor and (2) due to their weight make it difficult for the user to hold the device for long periods of time, or (3) be enclosed in housings that allow microorganisms and other residue to accumulate in the devices therefore increasing the risk of exposing teats to potentially harmful microorganisms.

Furthermore, current teat cleaning devices and systems may present safety concerns for the animals being milked and users milking the animals. The use of electrical components in teat cleaning devices may lead to stray voltages bleeding from the teat cleaning device to the animal deck and/or user. The teat cleaning devices and systems are also more difficult to stall out or overload in potential safety circumstances or when potential issues arise with teat shape or health.

Furthermore, current devices and systems are not optimized to elicit efficient milk-let down. There thus remains a need in the art for simple, lightweight teat cleaning devices that thoroughly clean a teat and efficiently elicit optimal milk let-down.

Furthermore, current devices and system may encourage dirt and soil to be returned up into the brushes instead of dropping off the brushes.

Finally, current devices and systems may call for cleaning and drying the teat with a brush after the pre-stripping process, which increases the delay time between pre-stripping and milking, or requires cleaning the teat with a brush before and after pre-stripping, increasing the time for the pre-milking process.

SUMMARY OF THE INVENTION

The present invention provides a teat cleaning system providing a cleaning brush having first and second rotatable brushes that are rotated to clean the teat of an animal and to deliver a disinfectant, germicide, and/or purified water to the teat of the animal. During a cleaning mode, the disinfectant, germicide, and/or purified water may be delivered through the cleaning brush, and during a drying mode, no disinfectant or germicide is delivered to dry brush the teat of the animal for whisking away fluid and drying the teat.

It is thus a feature of at least one embodiment of the present invention to provide hygienic benefits and lighter weight with a sealed "no cavity" design within the handle that only contains sealed channels delivering the direct needs to the end of the device (i.e., delivery of the germicide or disinfectant solution and power to rotate the first and second rotatable brushes) with no electrical connections or gears, pulleys, or belts within the device to wear out and potentially malfunction.

It is thus a feature of at least one embodiment of the present invention to differ from preexisting teat cleaning devices that have a drive cable or a drive motor within a handle distributing power via gears to a final array of multiple brushes or belts.

It is thus a feature of at least one embodiment of the present invention to include no electrical switch, electrical connections, or motors within the handle to reduce the risk that stray electrical voltage potential concerns to the animal or human operator in the wet environment that the device operates.

It is thus a feature of at least one embodiment of the present invention to use the pinch control/flow sensing feature to eliminate the need for a fluid contact solenoid or any solenoid valves in the system turning on and off the flow of liquid via and or air switch. A control panel with no solenoid valves needed for operation presents simplicity in size and components and also minimizes maintenance functions. The pinch control/flow sensing feature eliminates the need for running electrical wires to the trigger of the teat cleaning device or using an electrical switch in the trigger of the teat cleaning device.

It is thus a feature of at least one embodiment of the present invention to use a brush system where the brushes are positioned at the lateral sides of the teat to encourage dirt and debris to be brushed off the teat and to fall from the brushes. This is in contrast to a brush system where one or more brushes are positioned below the teat (for example, to clean the teat end) instead of at the sides of the teat, and therefore spins dirt and debris upward back onto the teat.

At least one embodiment of the present invention provides a teat cleaning device for cleaning a teat of an animal comprising: a handle having a proximal grip portion and a distal end, a first rotatable brush, the first rotatable brush attached to the distal end of the handle, a second rotatable brush, the second rotatable brush attached to the distal end of the handle, a first spinning drive cable, the first spinning drive cable connected to the first rotatable brush, and a second spinning drive cable, the second spinning drive cable connected to the second rotatable brush.

The teat cleaning device may further comprise a fluid line, a fluid delivery means, the fluid delivery means connected to the fluid line, attached to the distal end of the handle, and configured to deliver a fluid to the first and second rotatable brush, and a pinch trigger, the pinch trigger configured to restrict the flow of a fluid through the fluid line by allowing a user to reversibly pinch the fluid line.

The teat cleaning device may further comprise a splash guard, the splash guard housing at least a portion of the first and second rotatable brushes and having a teat receiving opening configured to receive a teat of the animal.

At least the first and second spinning drive cables may be disposed within the handle.

The handle may be single molded and may comprise at least one or more channels for housing each of the spinning drive cables and/or the fluid line.

The first and second rotatable brushes may comprise bristles arranged in a spiral configuration.

The first spinning drive cable may be configured to spin the first rotatable brush in a clockwise direction and wherein the second spinning drive cable is configured to spin the second rotatable brush in a counterclockwise direction.

The teat cleaning device may further comprise a motor, the motor connected to the teat cleaning device and configured to spin the at least two rotatable brushes at a speed when a voltage is supplied to the motor, and a control panel, the control panel configured to supply the voltage to the motor.

The control panel may be configured to spin the motor and the at least two rotatable brushes at a variable speed.

The control panel may be configured to spin the motor and the at least two rotatable brushes in a pulsating manner.

The teat cleaning device may further comprise a disinfectant or germicide container for housing a disinfectant or germicide fluid, a fluid line, the fluid line connecting the fluid reservoir and the fluid line of the teat cleaning device, and a fluid pump configured to pump the disinfectant or germicide through the fluid line to the teat cleaning device.

The teat cleaning device may further comprise an air line, the air line connecting an air source with the air line of the teat cleaning device and configured to deliver air through the air line to the first and second rotatable brush.

An alternative embodiment of the present invention is a method of cleaning a teat of an animal comprising: contacting a teat cleaning device with the teat of the animal, the teat cleaning device comprising a handle having a proximal grip portion and a distal end, a first rotatable brush, the first rotatable brush attached to the distal end of the handle, a second rotatable brush, the second rotatable brush attached to the distal end of the handle, a first spinning drive cable, the first spinning drive cable connected to the first rotatable brush, and a second spinning drive cable, the second spinning drive cable connected to the second rotatable brush; spinning the at least two rotatable brushes in a pulsating manner; delivering the fluid through the fluid line for a cleaning period; stop delivering the fluid through the fluid line for a drying period; and removing the at least two rotatable brushes of the teat cleaning device from the teat.

The teat cleaning device may deliver at least one of a disinfectant, germicide and water during the cleaning period. The cleaning period may be at least 15 seconds. The cleaning period may be at least 20 seconds.

The teat cleaning device may deliver air during the drying period of the time period. The drying period of the time period may be at least 3 seconds. The drying period of the time period may be at least 5 seconds.

The method may further comprise delivering a disinfectant or germicide prior to contacting the teat cleaning device with the teat of the animal and simulating the teats for pre-milking.

These particular objects and advantages may apply to only some embodiments falling within the claims and thus do not define the scope of the invention.

BRIEF DESCRIPTION OF DRAWINGS

FIG. 1 is a schematic drawing of one embodiment of a teat cleaning device of the present invention showing a cleaning brush having rotating brush heads;

FIG. 2 is a top perspective view of the cleaning brush head of the teat cleaning device having a splash guard and rotating brushes therein;

FIG. 3 is a top perspective view of the cleaning brush head of the teat cleaning device receiving a teat of an animal and brushes spinning inward and downward along the teat;

FIG. 4 is a cross-section taken along line 4-4 of FIG. 1 showing the spinning drive cables, fluid line and air line communicating through the handle of the teat cleaning device and a perspective view of the shaft end of the rotatable brushes insertable into the handle;

DETAILED DESCRIPTION OF THE INVENTION

Figure 5:
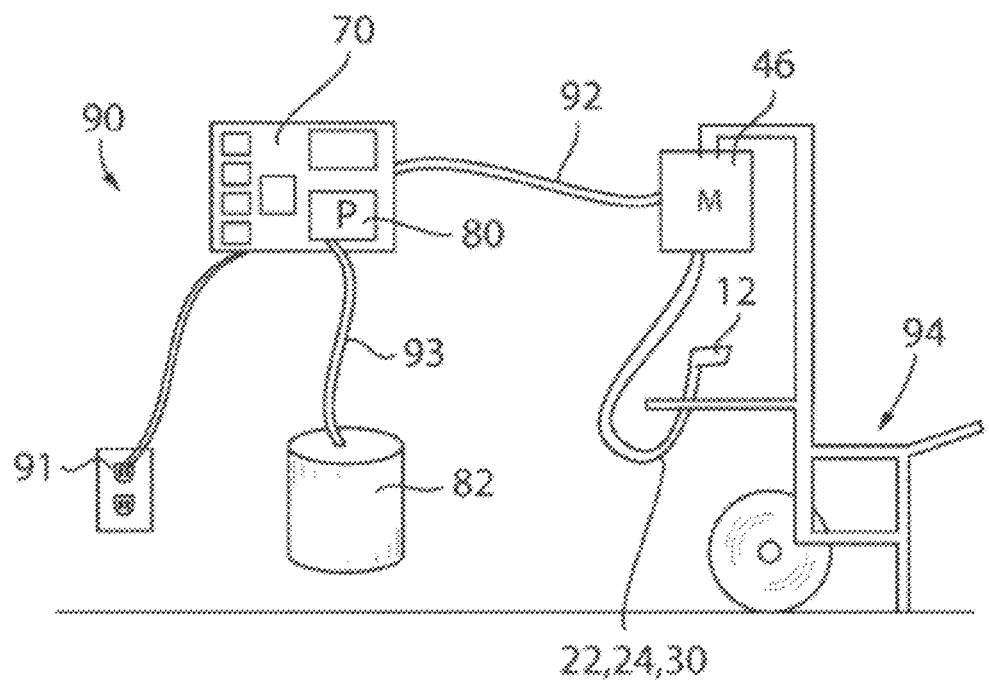
FIG. 5 is a schematic drawing of the teat cleaning system of one embodiment of the present invention showing use of the teat cleaning device in connection with a control panel and a motor of the system.

Teat cleaning devices and systems as well as methods are provided. The disclosed devices, systems, and methods may be used to apply disinfectants/germicides to teats, and clean and whisk dry teats prior to milking. In some embodiments, the teat cleaning devices and systems also enhances stimulation of the animal for faster milk let down via the variable control of the rotatable brushes (i.e., through the pulsating of brush rotation) and through the design of the rotatable brushes.

FIG. 1 shows a schematic drawing of one embodiment of a teat cleaning device 10. As shown in FIG. 1, the teat cleaning device 10 may include a handle 12 having a proximal grip end 14 and a distal end 16. The distal end 16 of the handle 12 may contain a brush end 60 receiving both a first rotatable brush 18 and a second rotatable brush 20.

The first rotatable brush 18 is connected to and communicates with a first spinning drive cable 22 and the second rotatable brush 20 is connected to and communicates with a second spinning drive cable 24. The first and second spinning drive cables 22, 24 may reside in a stationary cable sleeve so that the spinning cables are not exposed to the interior solid surface of handle 12. In some embodiments, the first and second spinning drive cables 22, 24 may be made of steel strands in their design and wound in a direction corresponding to their intended rotation—i.e., either in a clockwise or counterclockwise direction.

The teat cleaning device 10 in FIG. 1 also includes a fluid line 30, a fluid delivery means 32, and a pinch trigger 34. The fluid delivery means 32 may be a nozzle connected to the fluid line 30 and attached at the distal end 16 of handle 12 and configured to deliver a germicidal or disinfectant fluid to at least one of the first and second rotatable brushes 18, 20.

The handle 12 may be a single molded solid except for channels through which the first spinning drive cable 22, the second spinning drive cable 23, and the fluid line 30 extend from the rotatable brushes 18, 20 to the proximal end of handle 12. The teat cleaning device 10 has no gears within the handle 12 that would reduce the speed of a main cable and/or distributing power to other brushes via, for example, gears, belts, or pulleys.

Activation of the teat cleaning device 10 does not utilize electrical switches but uses the pinch trigger 34 mechanically starting and stopping the flow of fluid 40 within fluid line 30, and which may also then be sensed at an upstream fluid flow sensor 42 to start and stop the first and second rotatable brushes 18, 20. The pinch trigger 34 may include an electrical switch that starts fluid flow and the motion of the first and second rotatable brushes 18, 20 via an electrical signal using wires or a wireless signal back to a controller opening an electrical valve and starting flow while at the same time providing an electrical signal to a control panel 70 to start and stop motor or motors 46 via first and second spinning drive cables 22, 24.

The motor or motors 46 is connected to the teat cleaning device 10 and is configured to spin the at least two rotatable brushes via the first and second spinning drive cables 22, 24 at a speed when a voltage is supplied to the motor 46. Teat cleaning device 10 uses spinning drive cables 22, 24 from a drive unit 48 where a series of motors or motor 46 with mutable drive cable outputs are, optionally, housed in an upper motor section 50 away from the proximal grip end 14 of the handle 12 to spin the first and second rotatable brushes 18, 20 at a variable RPM that may range, for example, from 0 to 4000 RPM. In some embodiments, gears or belts as opposed to a series of motors may be used in the upper motor section because this section is not considered a "wet" location and gears or belts would not be expected to wear or malfunction in such a dry environment.

Referring also to FIGS. 2 and 3, in the embodiment shown in FIGS. 1-3, the teat cleaning device 10 includes two rotatable brushes 18, 20, however, it is contemplated that additional rotatable or non-rotatable brushes may be added to the distal end of handle 12. In some embodiments, the distal end of handle 12 may contain three, four, five, six, seven, eight, or more rotatable or non-rotatable brushes as desired by the operator. It is desirable that the brushes are positioned laterally with respect to the teat (not underneath the teat) to prevent recycling of dirt and debris upwards back onto the brushes and teat. In some embodiments, each additional rotatable brush may be connected to its own spinning driving cable.

Referring now to FIGS. 2 and 3, shown is the brush end 60 of the teat cleaning device 10 for cleaning a teat 52 of an animal. As shown in this embodiment, the first and second rotatable brushes 18, 20 of the teat cleaning device 10 may provide "enhanced stimulation" for milk let down promoting teat health with faster milk out and shorter milking machine time on the animal. To accomplish this, first and second rotatable brushes 18, 20 may contain bristles 62 arranged in a spiral or helical configuration about the circumference of the first and second rotatable brushes 18, 20. In some embodiments, the bristles 62 on the first rotatable brush 18 may be longer than the bristles 62 on the second rotatable brush 20, or vice versa.

Referring briefly to FIG. 4, the first and second rotatable brushes 18, 20 may be attached to the distal end 16 of the handle 12 by a shaft end 67 of the first and second rotatable brushes 18, 20 that, in at least one embodiment, may be keyed and have, for example, an inner circular bore 69 receiving a rod 71 of the rotating drive of the handle 12 and an outer hexagonal cross sectional profile 73 to provide traction with the corresponding hexagonal receiving hole 63 of the rotating drive of the handle 12. The first rotatable brush 18 may be spun in a clockwise direction while the second rotatable brush 20 may be spun in a counterclockwise direction. Such features promote the slight twist of the teat 52 for better teat cleaning by ensuring the bristles 62 contact additional teat 52 surface. These features enhance cleaning and stimulation of the teat 52 due to the massage action it presents to the teat 52 surfaces.

Also shown in FIG. 3, the first and second rotatable brushes 18, 20 may be offset (one brush lower than the other along an axis 68 in a direction of insertion of the teat 52) which aids in teat end cleaning during entrance and exit of the teat 52. In some embodiments, the first and second rotatable brushes 18, 20 may be different sizes (one brush diameter being larger than the other).

Referring to FIG. 3 the teat cleaning device 10 may further include a splash guard 64. The splash guard 64 may include left and right claws 64a, 64b receiving and enclosing the first and second rotatable brushes 18, 20 with a teat receiving opening 66 allowing the teat 52 to be received therethrough along the axis 68 and between the first and second rotatable brushes 18, 20.

Referring again to FIG. 1, the teat cleaning device 10 uses the pinch trigger 34 on the handle 12 that provides non-direct contact with fluid 40 through the wall of the fluid line 30. The pinch trigger 34 includes a trigger end 41 that is spring biased to press an opposed pinching end 43 against the fluid line 30. This stops and starts the fluid 40 that is pumped through the fluid line 30.

This fluid 40 flow may also be sensed by an upstream fluid flow sensor 42 that is also in non-fluid contact with the fluid 40 through the wall of the fluid line 30. The fluid flow sensor 42 may be a photoelectric, laser and or proximity type sensor. The fluid flow sensor 42 sends a signal to a control panel 70 to start the motor 46 and thus rotate the first and second rotatable brushes 18, 20 when flow is present and to stop rotation when flow stops. During the time of fluid flow, other functions may also be triggered such as RPM acceleration, deceleration, time constant run, etc.

While depressing the trigger end 41 of the pinch trigger 34, and in the cleaning mode, disinfectant or germicide fluid 40 and/or purified water 45 may be delivered and applied to the rotatable brushes 18, 20, and optionally, the control panel 70 may be programmed to pulsate the brush movement (RPM) via the programming changing acceleration and deceleration either rapidly or slowly smoothly throughout the cleaning cycle without stopping the movement completely.

By releasing the trigger end 41 of the pinch trigger 34, the flow of the disinfectant or germicide fluid stops and the rotatable brushes 18, 20 may continue to run in a drying mode for a specific period of time (i.e., one, two, three, four, five, six, seven, eight, nine, ten, or more seconds) to whisk away the fluid 40 to allow the teat 52 to dry prior to the milking unit attachment. In one embodiment, the drying mode may be at least 3 second or at least 5 seconds. In some embodiments, air may be delivered through the rotatable brushes 18, 20 during the drying mode, through an air line as further described below.

Referring to FIG. 4, in one embodiment of the teat cleaning device 10 the handle 12 may further support an air line 72. The air line 72 may be run through the handle 12 and end near the distal end 16 of the fluid line 30. The air line 72 may be used to mix air with the fluid 40 from the fluid line 30 to produce a foam at the first rotatable brush 18 and second rotatable brush 20. The air line 72 may also deliver air through the fluid line 30 during the drying mode.

Referring now to FIGS. 1 and 5, the teat cleaning device 10 shown in FIG. 1 may function in the following manner when the entire teat cleaning system 90 is in use. A fluid pump 80 pumps the disinfectant or germicide fluid 40 from a disinfectant or germicide container 82 through the fluid line 30 to the fluid delivery means 32. Also, a water inlet line pumps purified water 45 through the fluid line 30 alone or with the disinfectant chemicals. When the pinch trigger 34 is closed (off mode), the flow of the disinfectant, germicide and/or purified water is halted in the fluid line 30. When an operator squeezes the pinch trigger 34 (cleaning mode), the disinfectant, germicide and/or purified water in the fluid line 30 is allowed to flow and is delivered to the first and second rotatable brushes 18, 20 via the fluid delivery means 32. The flow of the disinfectant or germicide fluid may also be detected by the fluid flow sensor 42. Such detection is relayed to the control panel 70 which may run the motor 46 using a user specified program.

The inventors have engineered the control panel 70 to run the motor 46 or a series of motors (and thus the first and second drive cables 22, 24 and first and second rotatable brushes 18, 20) at variable speeds ranging from 0 to 4000 RPM and also potentially running the motor 46 (and thus the first and second drive cables 22, 24 and the first and second rotatable brushes 18, 20) in a pulsating manner in which the RPM of the motor 46 is ramped up (accelerated) and ramped down (decelerated) for a defined period of time determined by how long the trigger end 41 of the pinch trigger 34 is squeezed by the operator and how the program is set during depression of the trigger end 41 of the pinch trigger 34. The pulsating manner is designed to mimic animals' own natural suckling/pulling action, thus supplying enhanced stimulation over other fixed speed units. Furthermore, allowing the first and second rotatable brushes 18, 20 to run at variable speeds allows the operator to set the speed for individual needs pertaining to soil load on the animal needing to be cleaned and also can be adjusted for the animals' comfort.

Following the release of the pinch trigger 34 by the operator (drying mode), the control panel 70 may run the motor 46 at a constant or variable speed for an additional period of time (i.e., one, two, three, four, five, six, seven, seven, eight, nine, ten, or more seconds) to dry the teat and remove the disinfectant or germicide solution from the teat.

In one embodiment, the drying mode may be at least 3 second or at least 5 seconds. No disinfectant, germicide and/or purified water is delivered during the drying mode.

In some embodiments, the teat cleaning devices disclosed herein may be run with commercially available control panels such as the PULI-SISTEM motor control system, manufactured by Puli-Sistem of Cremona, Italy.

Referring now to FIG. 5, the teat cleaning device 10 may be a part of the teat cleaning system 90 in a configuration that may be used in a milking parlor. The control panel 70 may be located in a stationary position, for example, placed on or near a wall of the milking parlor. Power is supplied to the control panel 70 by a nearby electrical outlet 91. Also, near the control panel 70 is the disinfectant and germicide container 82 with a fluid line 93 running from the disinfectant and germicide container 82 to the fluid pump 80. A cord 92 may be a long composite cord that includes the fluid line 30 and wiring for the motor 46 and runs from the control panel 70 to the motor 46.

The motor 46 may be mounted on a trolley 94 that can be transported up and down the stalls of a milking parlor to the animals that need to be milked. From the motor 46, the first and second spinning drive cables 22, 24 as well as the fluid line 30 run to the teat cleaning device 10. The length of these components 22, 24, 30 may be relatively shorter than the length of the cord 92 given the distance between the movable trolley 94 and the animal to be milked is relatively shorter than the distance the trolley 94 must travel around the milking parlor to reach each animal that must be milked.

Figure 6:
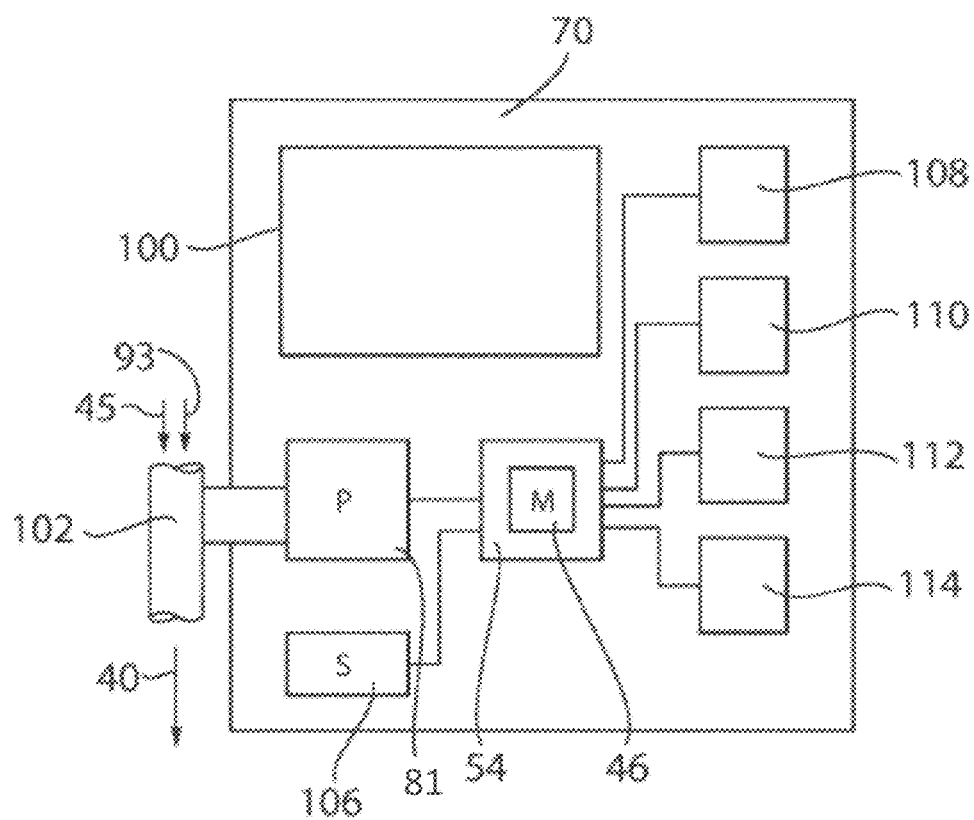
FIG. 6 is a schematic drawing of the control panel within a teat cleaning system.

Referring to FIG. 6, the control panel 70 was developed by the inventors to implement the teat cleaning methods described herein. The control panel 70 may include a transformer 100 (110 VAC in 24 VDC out), a fluid injector 102 receiving the disinfectant chemicals (i.e., disinfectant and germicide) to be mixed with purified water via a water line, a motor drive board 54, and a germicide pump 104, which work in the following manner within a teat cleaning system 90.

As described above, depressing the trigger end 41 of the pinch trigger 34 of the teat cleaning device 10 by an operator starts the flow of the germicide or disinfectant fluid 40 to the rotatable brushes 18, 20. The flow of the germicide or disinfectant fluid is simultaneously sensed at the fluid flow sensor 42. The fluid flow sensor 42 simultaneously sends a signal to a main timing relay 108 and a start up relay 110 starting the variable speed control panel 70. The rotatable brushes 18, 20 are rotated and an internal germicide pump 81, via an adjustable timing relay 110, drives the germicide or disinfectant fluid 40. The fluid flow sensor 42 and the main timing relay 108 may also communicate with an external pump that delivers the premixed solution or fluid 40 to the external pump when the internal germicide pump 81 on the control panel 70 is not used.

The start up relay 110 may be adjustable from 0-180 seconds and runs the rotatable brushes 18, 20 at constant speed at start up or through the cleaning process, if desired, depending on a time set then. The start up relay 110 then switches to the pulse timing relay 112 that starts the pulse action if desired. This pulse timing relay 112 is also adjustable by time on and off along with acceleration, deceleration and dynamic braking adjustments available on the control panel 70 creating the pulse action along with the main timing relay 108. A potentiometer of the control panel 70 may be used to vary the speed of the rotating brushes 18, 20.

When the desired cleanliness is achieved, the operator releases the trigger end 41 of the pinch trigger 34. The flow through the fluid line 30 is stopped and sensed by the flow sensor 42. A dry time relay 114 then takes over and keeps the rotatable brushes 18, 20 running for a set time, for example, 0-10 or more seconds, and the operator generally then uses the rotation of rotatable brushes 18, 20 without additional fluid 40 to be added to whisk off the fluid 40 that may be left on the brush surfaces. This final process can be programmed to have no dry time, programmed to achieve a higher, lower or same RPM of brushes as cleaning process, or at constant speed and/or pulse motion during the dry cycle time. Therefore, the germicide application and drying process is complete through a single application of the teat cleaning device 10 to the teat 52.

In one embodiment of the invention, methods of cleaning a teat 52 of an animal are also provided. The methods may include having the milking cow arrive at the milking position with soiled teats from the environment. The first position operator hand applies or uses an automated application to apply pre-dip and/or germicide to the teats by hand or through an automated process. The first position operator will then pre-strip the teats to visually check the quality of the milk for abnormalities.

A second position operator then further disinfects the teat by using the teat cleaning device 10 by applying the at least two rotatable brushes 18, 20 around the teat 52 of the animal, and spinning the at least two rotatable brushes 18, 20 with fluid delivery in a pulsating manner for a specified time period by pressing the trigger end 41 of the pinch trigger 34. In some embodiments of the present methods, the time period may be between 1 and 10 seconds, 1 and 20 seconds, or 1 and 30 seconds. The germicide is applied for a total of 15 to 90 seconds and at least 15 seconds and at least 20 seconds in order to kill the bacteria on the teats. The teat cleaning device 10 is then used to remove the germicide and leaving the teat clean and dry by releasing the trigger end 41 of the pinch trigger 3.

Once the two rotatable brushes 18, 20 finishes spinning, the second position operator then removes the at least two rotatable brushes 18, 20 from the teat 52. A third position operation then applies the milking machine to the teat. The teat cleaning device 10 used in the present methods may be any of the teat cleaning devices described herein.

It is understood that the teat cleaning device 10 acts to rinse the surface to remove prior-applied disinfectant, for example, pre-dip and/or germicide. Where a disinfectant chemical is already applied by hand or a separate device prior to use of the teat cleaning device 10, disinfectant or germicide fluid 40 and/or purified water 45 may be dispensed while brushing to rinse off chemical residues to accomplish chemical residue removal, cleaning, rinsing, and drying by the same whisking off process. Thereby, the teat cleaning system takes the place of commonly used "towel to wipe" to remove the chemical solution off of the teat, which is time consuming and can introduce unwanted bacteria or other contaminants.

As used herein, the term "pulsating manner" refers to accelerating and decelerating the rotatable brushes either rapidly or slowly throughout a cleaning cycle without stopping the movement completely.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

I claim:

1. A teat cleaning device comprising:
    a handle having a proximal grip portion and a distal end;
    a first rotatable brush, the first rotatable brush attached to the distal end of the handle;
    a second rotatable brush, the second rotatable brush attached to the distal end of the handle;
    a splash guard housing the first rotatable brush and the second rotatable brush and defining a teat receiving opening, between the first rotatable brush and the second rotatable brush, configured to receive a teat of an animal;
    a first spinning drive cable, the first spinning drive cable connected to the first rotatable brush;
    a second spinning drive cable, the second spinning drive cable connected to the second rotatable brush;
    a motor including a first drive cable output and a second drive cable output, the first drive cable output coupled to the first spinning drive cable, the first spinning drive cable and the first drive cable output configured to spin the first rotatable brush in a clockwise direction, the second drive cable output coupled to the second spinning drive cable, the second spinning drive cable and the second drive cable output configured to spin the second rotatable brush in a counterclockwise direction, wherein the motor is positioned outside of the handle, and wherein the first drive cable output is coupled to the first spinning drive cable outside of the handle and the second drive cable output is coupled to the second spinning drive cable outside of the handle;

a mechanical pinch trigger that, when actuated, mechanically starts and stops a flow of fluid to the handle; and a flow sensor configured to detect the flow of fluid to the handle to thereby cause the motor to start the first drive cable output configured to spin the first rotatable brush in the clockwise direction and to start the second drive cable output configured to spin the second rotatable brush in the counterclockwise direction.

2. The teat cleaning device of claim 1, further comprising:
a fluid line;
a fluid delivery means, the fluid delivery means connected to the fluid line, attached to the distal end of the handle, and configured to deliver the fluid to the first and second rotatable brush; and
the pinch trigger configured to mechanically restrict the flow of a fluid through the fluid line by allowing a user to reversibly pinch the fluid line.

3. The teat cleaning device of claim 1, wherein at least the first and second spinning drive cables are disposed within the handle, and wherein there are no gears, for distributing power to the first rotatable brush and the second rotatable brush, disposed within the handle.

4. The teat cleaning device of claim 1, wherein the first and second rotatable brushes comprise bristles arranged in a spiral configuration.

5. The teat cleaning device of claim 1, wherein the handle is single molded and comprises at least one or more channels for housing each of the spinning drive cables and/or the fluid line.

6. The teat cleaning device of claim 1,
wherein the motor is configured to spin the first and second rotatable brushes at a speed when a voltage is supplied to the motor, and
further comprising a control panel, the control panel configured to supply the voltage to the motor.

7. The teat cleaning device of claim 6, wherein the control panel is configured to spin the motor and the first and second rotatable brushes at a variable speed.

8. The teat cleaning device of claim 6, wherein the control panel is configured to spin the motor and the first and second rotatable brushes in a pulsating manner.

9. The teat cleaning device of claim 1, further comprising
a disinfectant or germicide container for housing a disinfectant or germicide fluid,
a fluid line, the fluid line connecting a fluid reservoir and the fluid line of the teat cleaning device, and
a fluid pump configured to pump the disinfectant or germicide through the fluid line to the teat cleaning device.

10. The teat cleaning device of claim 1 further comprising an air line, the air line connecting an air source with the air line of the teat cleaning device and configured to deliver air through the air line to the first and second rotatable brush.

11. A method of cleaning a teat of an animal comprising:
contacting a teat cleaning device with the teat of the animal, the teat cleaning device comprising a handle having a proximal grip portion and a distal end, a first rotatable brush, the first rotatable brush attached to the distal end of the handle, a second rotatable brush, the second rotatable brush attached to the distal end of the handle, a splash guard housing the first rotatable brush and the second rotatable brush and defining a teat receiving opening, between the first rotatable brush and the second rotatable brush, configured to receive the teat of the animal, a first spinning drive cable, the first spinning drive cable connected to the first rotatable brush, a second spinning drive cable, the second spinning drive cable connected to the second rotatable brush, and a motor, the motor including a first drive cable output and a second drive cable output, the first drive cable output coupled to the first spinning drive cable, the second drive cable output coupled to the second spinning drive cable, wherein the motor is positioned separate from the handle, and wherein the first drive cable output is coupled to the first spinning drive cable separate from the handle and the second drive cable output is coupled to the second spinning drive cable separate from the handle;
actuating a mechanical pinch trigger to mechanically start and stop a flow of fluid to the handle;
detecting, via a flow sensor, the flow of fluid to the handle;
in response to detecting the flow of fluid to the handle, starting spinning of the at least two rotatable brushes in a pulsating manner including spinning the first rotatable brush in a clockwise direction via the first spinning drive cable and the first drive cable output and spinning the second rotatable brush in a counterclockwise direction via the second spinning drive cable and the second drive cable output;
delivering the fluid through a fluid line for a cleaning period;
cease delivering the fluid through the fluid line for a drying period; and
removing the at least two rotatable brushes of the teat cleaning device from the teat.

12. The method of claim 11, wherein the teat cleaning device delivers at least one of a disinfectant, germicide and water during the cleaning period.

13. The method of claim 12, wherein the cleaning period is at least 15 seconds.

14. The method of claim 13, wherein the cleaning period is at least 20 seconds.

15. The method of claim 11, wherein the teat cleaning device delivers air during the drying period of the time period.

16. The method of claim 15, wherein the drying period of the time period is at least 3 seconds.

17. The method of claim 16, wherein the drying period of the time period is at least 5 seconds.

18. The method of claim 11, further comprising delivering a disinfectant or germicide prior to contacting the teat cleaning device with the teat of the animal and stimulating the teats for pre-milking prior to contacting the teat cleaning device with the teat of the animal.

\* \* \* \* \*